(12) United States Patent
Kaino

(10) Patent No.: US 6,618,985 B1
(45) Date of Patent: Sep. 16, 2003

(54) MOUSE TRAP

(76) Inventor: Hiroshi Kaino, 7-12 Mizohara Machi, Sakado-City, Saitama-ken (JP)

( * ) Notice: Subject to any disclaimer, the term of this patent is extended or adjusted under 35 U.S.C. 154(b) by 0 days.

(21) Appl. No.: 10/176,097

(22) Filed: Jun. 21, 2002

(30) Foreign Application Priority Data

Jul. 9, 2001 (JP) ........................................ 2001-207916

(51) Int. Cl.⁷ .............................................. A01M 1/14
(52) U.S. Cl. ................................ 43/114; 43/58; 43/88; 43/67
(58) Field of Search .............................. 43/114, 58, 88, 43/67

(56) References Cited

U.S. PATENT DOCUMENTS

| | | | | |
|---|---|---|---|---|
| 622,700 A | * | 4/1899 | Mackintosh | 43/88 |
| 837,511 A | * | 12/1906 | Schneekloth | 43/88 |
| 1,038,672 A | * | 9/1912 | Sprague | 43/88 |
| 1,080,623 A | * | 12/1913 | Brorby | 43/88 |
| 1,479,853 A | * | 1/1924 | Gambee | 43/88 |
| 1,569,827 A | * | 1/1926 | Rancier | 43/88 |
| 1,850,534 A | * | 3/1932 | Clausen | 43/88 |
| 3,398,478 A | * | 8/1968 | Pearsall | 43/58 |
| 3,864,866 A | * | 2/1975 | Kosinsky | 43/58 |
| 4,385,465 A | * | 5/1983 | Palmeri | 43/58 |

FOREIGN PATENT DOCUMENTS

| | | | | |
|---|---|---|---|---|
| GB | 20955526 A | * | 10/1982 | 43/58 |
| JP | 05076266 A | * | 3/1993 | 43/58 |

* cited by examiner

Primary Examiner—Charles T. Jordan
Assistant Examiner—Joan M. Olszewski
(74) Attorney, Agent, or Firm—Israel Gopstein

(57) ABSTRACT

A mouse trap includes: a main body including a top plate and right and left side plates, of resilient material and suspended downwardly from opposite ends of the top plate, to be oppositely closed by their own resiliency, for holding and capturing a mouse therebetween; a bottom plate pivoted at one end to the lower end of one of the side plates; a stopper having a pair of engagement projections fixed to the other end of the bottom plate at its upper surface; an engagement releasing lever pivoted to both projections and having one end rising slantwise inside the main body and another end disposed under the lower end of the other side plate; a bait placing member pivoted to and erected at one end of the engagement releasing lever and freely inclined onto one side; and an adhesive sheet detachably stretched over the inner surface of the main body.

3 Claims, 4 Drawing Sheets

MOUSE TRAP

BACKGROUND OF THE INVENTION

1. Field of the Invention

The present invention relates to a mouse trap.

2. Description of the Related Art

There is known a conventional mouse trap, in which a port to be opened or closed by a shutter is formed in a box made of a wire net, and the shutter is held with the port thereof opened in engagement with an engaging portion connected in association with a bait hook housed inside of the box. When a mouse bites on a bait placed on the bait hook, the bait hook is pulled, so that the shutter is released from engagement, and then, drops by resiliency. The port is closed and thus, the mouse can be captured.

Furthermore, there is known a mouse trap, in which an adhesive agent is applied to the upper surface of a flat cardboard, which is then put at a position where a mouse is likely to pass through, with the adhesive agent facing upside, whereby when the mouse passes on the adhesive agent, the mouse can be bonded to the adhesive agent, to be thus captured.

However, the former mouse traps are large in size, and are therefore inconvenient for transportation and storage. Moreover, there arises a problem in that it is unpleasant for a user to dispose of the captured mouse, thereby inhibiting a user from application of the traps.

In addition, the learning ability of a mouse is high, and therefore, there arises a problem that since the wire net smells of a mouse if one mouse is trapped in the box, another mouse is hardly likely to be trapped in the box.

Additionally, in the latter mouse trap, the adhesiveness is weakened with time since hairs of paws or a belly of the captured mouse are bonded to the adhesive agent. Further, the captured mouse remains completely exposed, thereby raising a problem of unpleasantness in disposing of the captured mouse and inducing inhibitions on the part of a user.

SUMMARY OF THE INVENTION

The present invention has been developed in an attempt to solve the above problems observed in the above-described conventional mouse traps. An object of the present invention is to provide a mouse trap, in which when a mouse rides on a bait placing member in an engagement holding state in which resilient right and left side plates of a main body are opened, a stopper is rotated by the weight of the mouse, thereby releasing the engagement of one of the side plates; both of the side plates are closed by their own resiliency, and then, the mouse is firmly bonded to an adhesive sheet stretched over the inner surface of the main body, and further, is securely held by the resiliency of both of the side plates, so that the mouse can be certainly captured with high capturing capability without allowing any escape; the mouse trap can be compactly stored and is convenient for transportation and storage; the captured mouse can be disposed of while wrapped by the adhesive sheet without any inhibition on the part of the user; and the mouse trap is simple in configuration and low in cost.

In order to achieve the above-described object, a mouse trap according to the present invention comprises: a main body including a top plate and right and left side plates made of disk springs or the like, the side plates being oppositely suspended downward from both of right and left ends of the top plate, to be oppositely closed by their own resiliency, for holding and capturing a mouse therebetween; a bottom plate turnably pivoted at one end thereof to the lower end of one of the side plates; a stopper projecting from the upper surface at the other end of the bottom plate, for engaging and holding the lower end of the other side plate in an open state against the resiliency; an engagement releasing lever pivoted to the stopper slightly behind the center thereof in a turnable manner in a vertical direction, having one end slantwise rising inside of the main body and the other end disposed under the lower end of the side plate in such a manner as to push up the other side plate; a bait placing member erected at the inner end of the engagement releasing lever; and an adhesive sheet detachably stretched over the inner surface of the main body.

Furthermore, the stopper may include a pair of projections projecting from the upper surface on the other side of the bottom plate with a predetermined interval in a longitudinal direction, for engaging and holding the lower end of the other side plate in the open state against the resiliency.

Moreover, the bait placing member is pivoted to and erected at the inner end of the engagement releasing lever in a freely inclined manner.

The mouse trap according to the present invention is normally (i.e., when not in use) held in substantially a V shape, as viewed from the front, in which the right and left side plates of the main body are closed by their own resiliency, that is, the lower ends of both of the side plates abut against each other.

When the above-described mouse trap is used, the right and left side plates are manually pushed to extend outwardly against their own resiliency in a symmetric manner, the lower end of one of the side plates is allowed to engage with the stopper having the pair of engaging projections at the upper surface of the bottom plate, so that both of the side plates are held in substantially the vertical state, and consequently, the main body is held with the front surface and the rear surface opened, and then, the right and left ends of the adhesive sheet are fitted into guide grooves formed at the lower ends of the side plates, and subsequently, the adhesive sheet is stretched over the inner surface of the main body.

Next, a mouse's favorite bait is placed on the bait placing member, and then, the mouse trap is set at a place where a mouse is likely to pass through.

In this way, a mouse is lured to the bait to enter the main body through the port formed at the fore or rear surface of the main body, and then, rides on the bait placing member. At this time, the bait placing member is descended by the weight of the mouse, and then, the engagement releasing lever is turned, so that the inner end is lowered while the other end is elevated, thereby pushing up the other side plate, so as to release the lower end of the side plate from the stopper.

In this manner, since both of the side plates are closed opposite to each other by their own resiliency, the mouse is bonded from right and left to the side plates via the adhesive sheet, to be strongly held from right and left, and thus, is captured.

Thereafter, the captured mouse is taken out of the main body with the adhesive sheet, and then, is disposed while being wrapped with the adhesive sheet. Only the main body can be recycled.

DETAILED DESCRIPTION OF THE PREFERRED EMBODIMENT

A preferred embodiment of a mouse trap according to the present invention will be described below with reference to the accompanying drawings.

Figure 1:
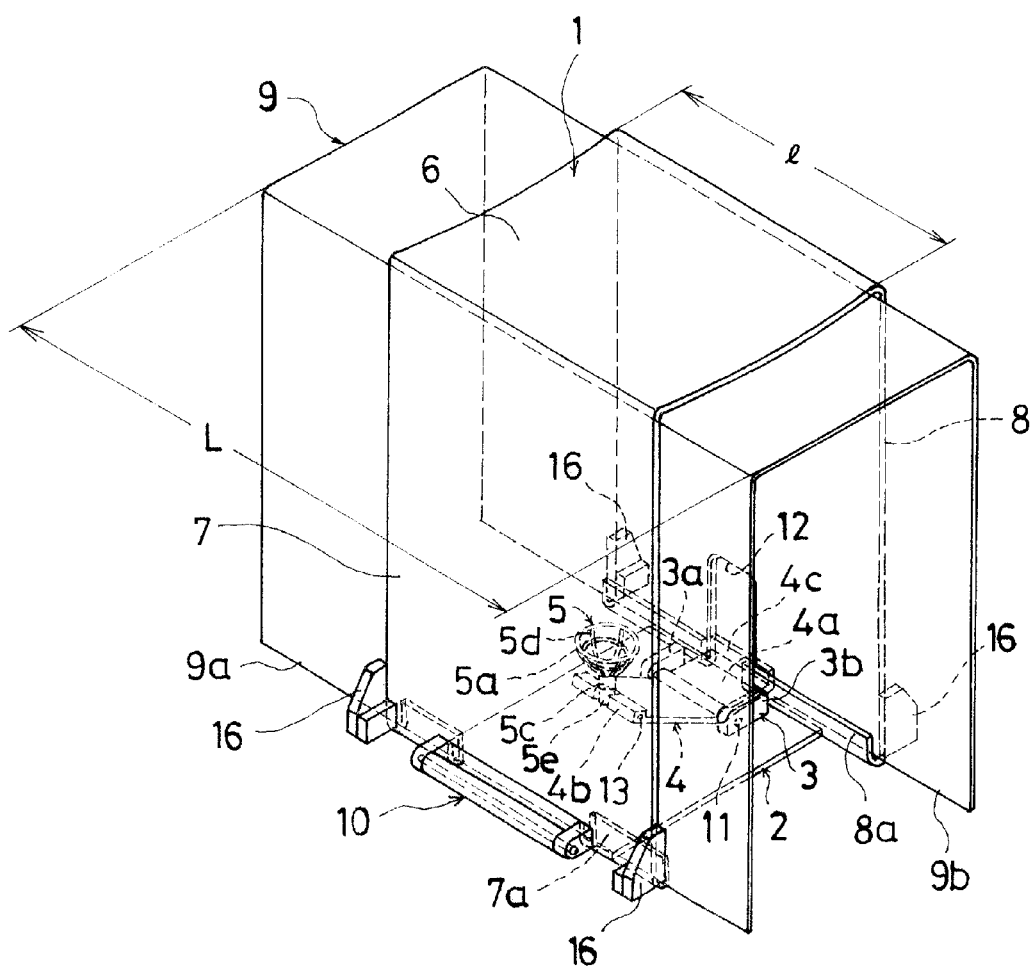
FIG. 1 is a perspective view showing a mouse trap in use in a preferred embodiment according to the present invention.
Figure 2:
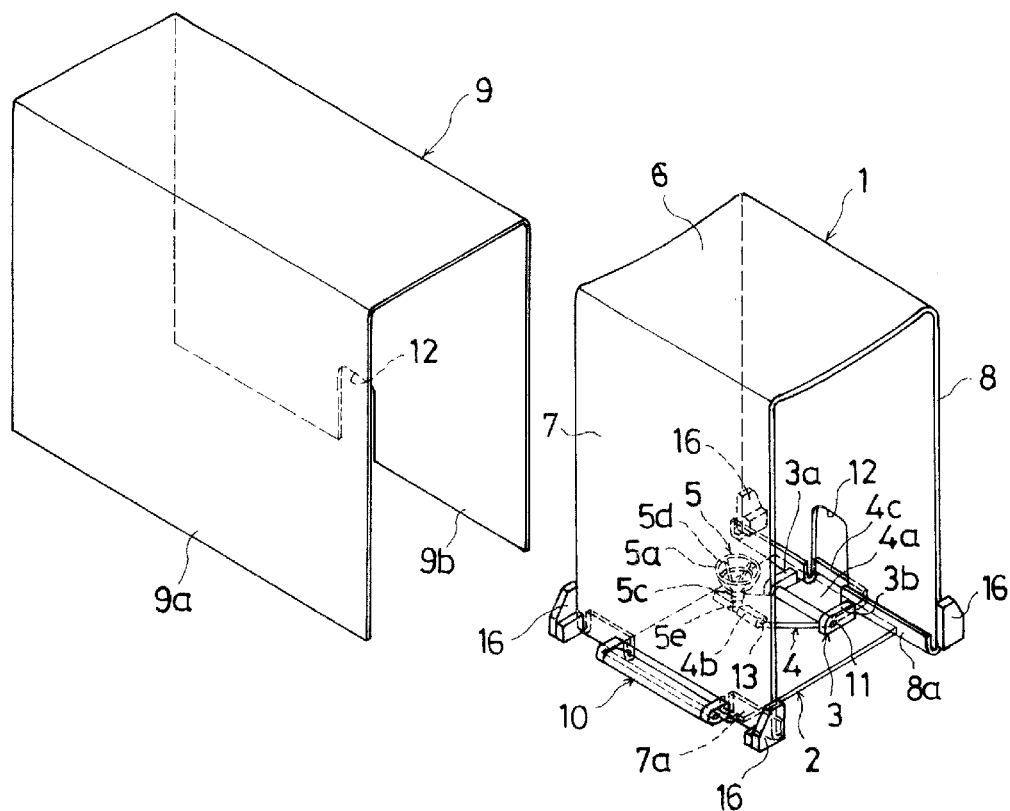
FIG. 2 is an exploded perspective view showing a main body in use and an adhesive sheet in the mouse trap according to the present invention.
Figure 3:
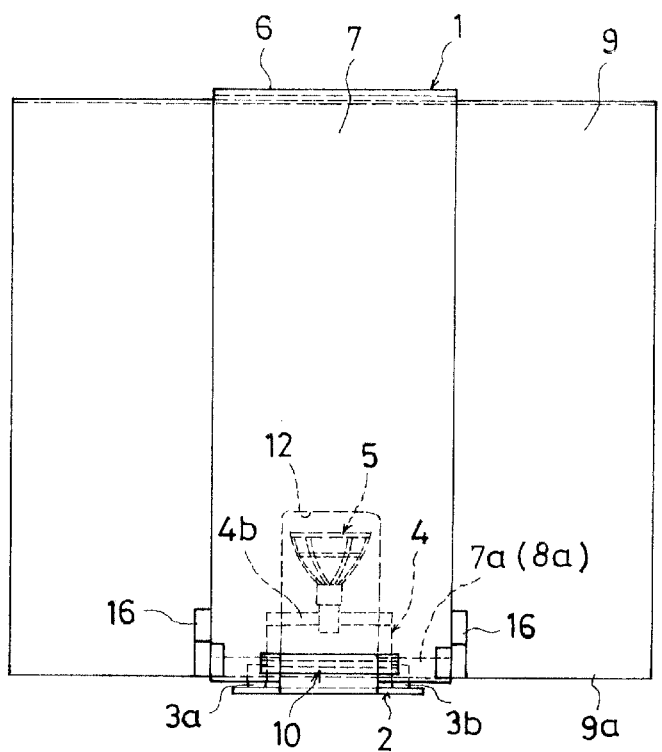
FIG. 3 is a left side view of FIG. 1.
Figure 4:
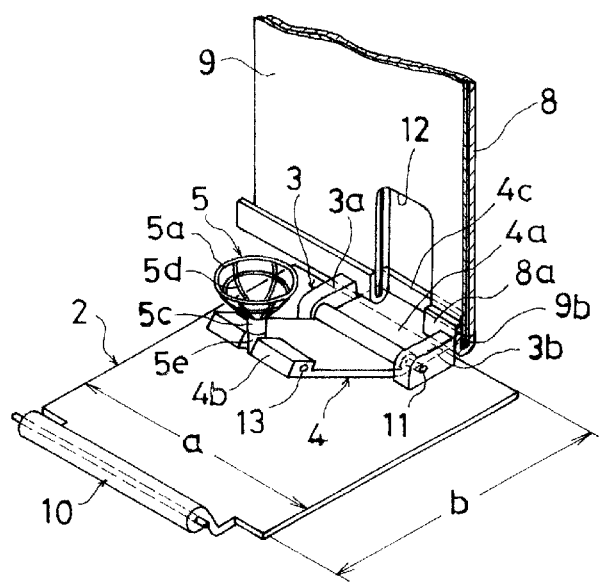
FIG. 4 is a perspective view showing a bottom plate, a stopper and an engagement releasing lever in the mouse trap according to the present invention in the state in which the lower end of one of side plates in the main body engages with the stopper.
Figure 5:
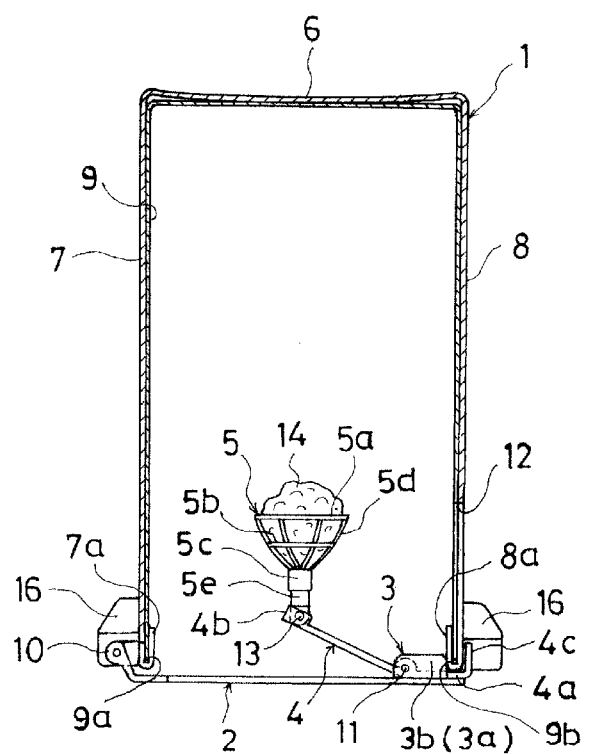
FIG. 5 is a longitudinal cross-sectional view showing the center of the mouse trap in use according to-the present invention.
Figure 6:
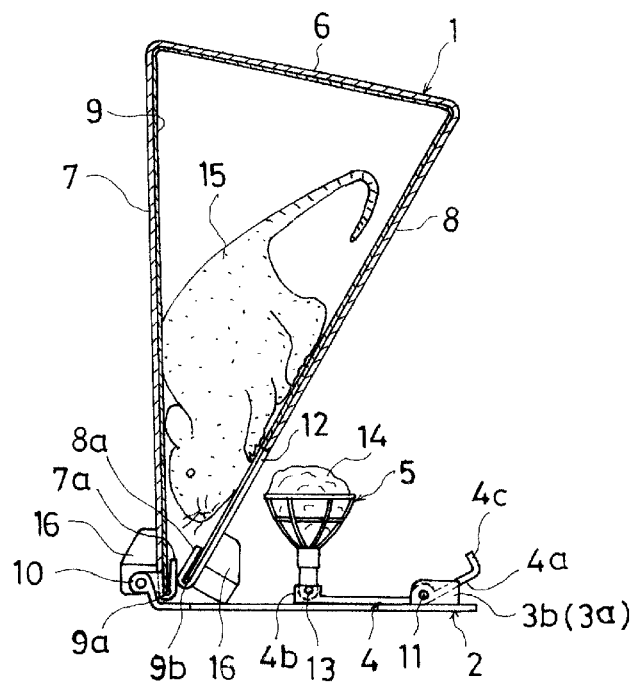
FIG. 6 is a longitudinal cross-sectional view showing the mouse trap according to the present invention in the state in which a mouse is captured.
Figure 7:
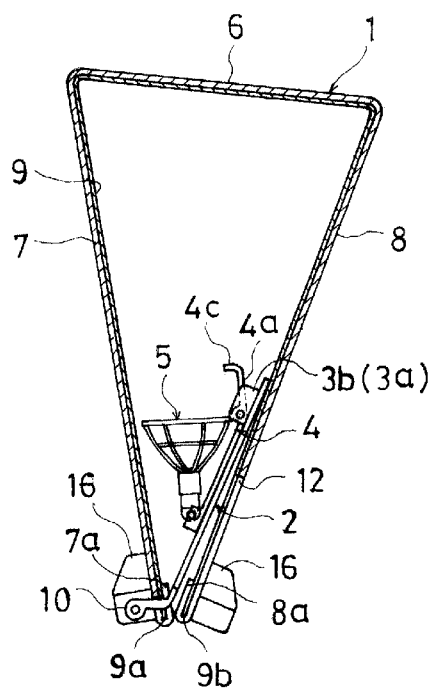
FIG. 7 is a longitudinal cross-sectional view showing the center of the mouse trap according to the present invention when the mouse trap is stored.

FIG. 1 is a perspective view in which the lower end of one of right and left side plates of the inventive mouse trap engages with and is held in a stopper in the state in which the side plates are symmetrically opened outwardly against the resiliency of a main body, and further, in which an adhesive sheet is stretched over the inner surface of the main body. FIG. 2 is a perspective view showing the main body with the right and left side plates held in an open state and the adhesive sheet bent downward in a U shape, as viewed from the front. FIG. 3 is a left side view of FIG. 1. FIG. 4 is a perspective view showing each of a bottom plate, a stopper, an engagement releasing lever, a bait placing member and the lower end of one of the side plates. FIG. 5 is a longitudinal cross-sectional view showing the center of the mouse trap in use according to the present invention. FIG. 6 is a longitudinal cross-sectional view showing the center of the mouse trap according to the present invention in the state in which a mouse is captured; and FIG. 7 is a longitudinal cross-sectional view showing the center of the mouse trap in the state in which the mouse trap is stored.

The mouse trap according to the present invention is essentially constituted of the following members: a main body 1, a bottom plate 2, a stopper 3, an engagement releasing lever 4 and a bait placing member 5, as shown in FIGS. 1 to 7.

The main body 1 is configured as follows:

As shown in FIGS. 1 to 3, a top plate 6 and left and right side plates 7 and 8 oppositely projecting downward from both of right and left ends of the top plate 6 are made of plastic or metal having a spring property (resiliency), and are integrated with each other with both of front and back surfaces and a bottom surface opened, thereby obtaining the main body 1.

Both of the left and right side plates 7 and 8 are oppositely closed inwardly by the resiliency of the main body 1 in a normal condition (i.e., when not in use), as shown in FIG. 7, so that the lower ends of the side plates 7 and 8 are held in abutment against each other. That is to say, the side plates 7 and 8 are oppositely inclined inwardly, and thus, are kept in substantially a V shape, as viewed from the front.

Furthermore, at the lower ends of the side plates 7 and 8 are formed guide grooves 7a and 8a, respectively, with curvature substantially into a V shape, as viewed from the front, for allowing both of left and right ends 9a and 9b of an adhesive sheet 9 to be engageably fitted thereinto.

The bottom plate 2 is configured as follows:

As shown in FIGS. 1, 2 and 4, the longitudinal length a of the bottom plate 2 is greater by a desired dimension than a longitudinal length l of the main body 1, and further, the lateral width b of the bottom plate 2 is greater by a desired dimension than a dimension of each of the left and right side plates 7 and 8 opened in substantially a vertical state in the main body 1.

Moreover, in the bottom plate 2, the lower end of the side plate 7 in the main body 1 is turnably pivoted to one end (the left end in the drawings) of the bottom plate 2 via a pin 10 or the like, as shown in FIGS. 1, 2 and 5 to 7.

The stopper 3 is configured as follows:

As shown in FIGS. 1, 2, 4 and 5, a pair of projections 3a and 3b project from the upper surface of the bottom plate 2 with a predetermined interval in a longitudinal direction on a side opposite to the side to which the side plate 7 is pivoted. To the outer surfaces of the projections 3a and 3b is engageably fitted the inner surface of the lower end of the other side plate 8 in substantially a vertical direction against the resiliency.

The engagement releasing lever 4 is configured as follows:

As shown in FIGS. 1, 2, 4 and 5, the engagement releasing lever 4 is formed into substantially a V shape, as viewed from the front. The bending portion of the stopper 3 is pivoted to the projections 3a and 3b via pins 11 or the like between the projections 3a and 3b of the stopper 3, so that one end 4a is located under the lower end of the side plate 8 while the other end is slantwise elevated inside of the main body 1. The engagement releasing lever 4 is turned counterclockwise in FIG. 5 by pushing down an inner end 4b, which is slantwise elevated. The end 4a is elevated to push up the lower end of the side plate 8, whereby the side plate 8 is disengaged from the projections 3a and 3b constituting the stopper 3.

Moreover, a narrow projecting piece 4c is formed at the end 4a of the engagement releasing lever 4 in such a manner as to project upwardly with curvature in substantially the vertical direction. Additionally, when the side plates 7 and 8 are closed by their own resiliency, an opening 12, into which the projecting piece 4c is inserted, is formed through the side plate 8 and the adhesive sheet 9.

The bait placing member 5 is configured as follows:

As shown in FIGS. 1 to 5, the bait placing member 5 is formed in substantially the shape of a basket or a funnel, as viewed from the front, with an upper large-diameter ring 5a, an intermediate small-diameter ring 5b, a lower smallest-diameter cylindrical portion 5c and a plurality of elongated rods 5d . . . for connecting the rings 5a and 5b and the cylindrical portion 5c to each other at predetermined intervals in a circumferential direction. The lower end of a vertical rod 5e vertically provided at the lower end of the center of the cylindrical portion 5c by fitting and fixing can be erected and held in a vertical state via a center pin 13 at the slantwise elevated inner end of the engagement releasing lever 4, and further, can be pivoted toward one side (rightward in FIG. 5) in a tiltable manner.

Consequently, the bait placing member 5 is normally held at an elevated position, as shown in FIGS. 1 to 5. When a mouse 15 rides on the bait placing member 5, on which is placed bait 14, the bait placing member 5 descends due to the weight of the mouse 15, so that the engagement releasing lever 4 is turned counterclockwise in FIG. 5. Thereafter, the end 4a of the engagement releasing lever 4 is elevated, so that the lower end of the side plate 8 is pushed up, to be thus released from the stopper 3. In this way, the side plates 7 and 8 are oppositely closed by their own resiliency, and consequently, the mouse 15 can be bonded, held and captured via the adhesive sheet 9 stretched inside, as shown in FIG. 6.

Additionally, in the mouse trap according to the present invention, the bait placing member 5 is tilted toward one side, before the bottom plate 2 is rotated inwardly of the side plate 7 on the pivotal pin 10, and subsequently, the other side plate 8 is arranged behind the bottom plate 2, so that both of the side plates 7 and 8 are closed in abutment against each other at both of the lower ends thereof by the resiliency, as shown in FIG. 7. By the use of the resiliency, the stopper 3, the engagement releasing lever 4 and the bait placing member 5 are held between the side plates 7 and 8.

An adhesive agent, not shown, is applied to the inner surface of the adhesive sheet 9, which is bent in such a manner that the front, rear and lower surfaces thereof are opened. Thereafter, the adhesive sheet 9 is inserted into the main body 1 while the left and right side plates 7 and 8 of the main body 1 are held in an open state.

Furthermore, the adhesive sheet 9 is configured such that its length L in a longitudinal direction is greater by a desired dimension than the length l of the main body 1 in the longitudinal direction, as shown in FIG. 1, in such a manner as to completely wrap the captured mouse 15.

Incidentally, reference numeral 16 designates opening grips attached to the lower ends of the left and right side plates 7 and 8.

According to the present invention, with the above-described configuration, when the mouse rides on the bait placing member, the engagement releasing lever is turned by the weight of the mouse, and then, one end of the engagement releasing lever is elevated so as to push up one of the side plates in engagement with the stopper, whereby the engagement releasing lever is released from the side plate. Both of the side plates are closed by the strong closing force caused by their own resiliency, so that the mouse can be firmly bonded to the adhesive layer of the adhesive sheet stretched inside from right and left and can be steadily held between the side plates. Consequently, it is possible to securely capture the mouse with high capturing capability while precluding escape of the captured mouse.

Moreover, during non-use, all of the bottom plate, the engagement releasing lever, the stopper and the bait placing member can be compactly contained between the side plates in a state in which the right and left side plates are closed in abutment against each other at the lower ends thereof by the use of their own resiliency, and therefore, the mouse trap according to the present invention is convenient for transportation, storage and the like.

Furthermore, since the mouse is held and captured between the right and left side plates by the use of the resiliency of the main body, it is possible to dispense with a special spring member, a stretching mechanism therefor and the like, thereby providing a mouse trap having a simple structure at a reduced cost.

It is to be understood that the present invention is not restricted to the particular embodiment given above, and that various modifications and alterations can be added thereto without departing from the scope of the invention.

What is claimed is:

1. A mouse trap comprising:
    a main body including a top plate and right and left side plates made of resilient material, the side plates being oppositely suspended downward from both of right and left ends of the top plate, to be oppositely closed by their own resiliency, for holding and capturing a mouse therebetween;
    a bottom plate turnably pivoted at one end thereof to a lower end of one of the side plates of the main body;
    a stopper projecting from an upper surface at the other end of the bottom plate, for engaging and holding a lower end of the other side plate in an open state against the resiliency;
    an engagement releasing lever pivoted to the stopper slightly behind the center thereof in a turnable manner in a vertical direction, having one end slantwise rising inside of the main body and the other end disposed under the lower end of the side plate in such a manner as to push up the other side plate;
    a bait placing member erected at an inner end of the engagement releasing lever; and
    an adhesive sheet detachably stretched over the inner surface of the main body.

2. A mouse trap as claimed in claim 1, wherein the stopper is constituted of a pair of projections projecting from the upper surface on the other side of the bottom plate with a predetermined interval in a longitudinal direction, for engaging and holding the lower end of the other side plate in the open state against the resiliency.

3. A mouse trap as claimed in claim 1, wherein the bait placing member is pivoted to and erected at the inner end of the engagement releasing lever in a freely inclined manner.

\* \* \* \* \*